Oct. 23, 1956      K. R. GEISER      2,768,049
CONTINUOUS RUNNING RECORDER FOR TRANSIENTS
Filed May 23, 1951
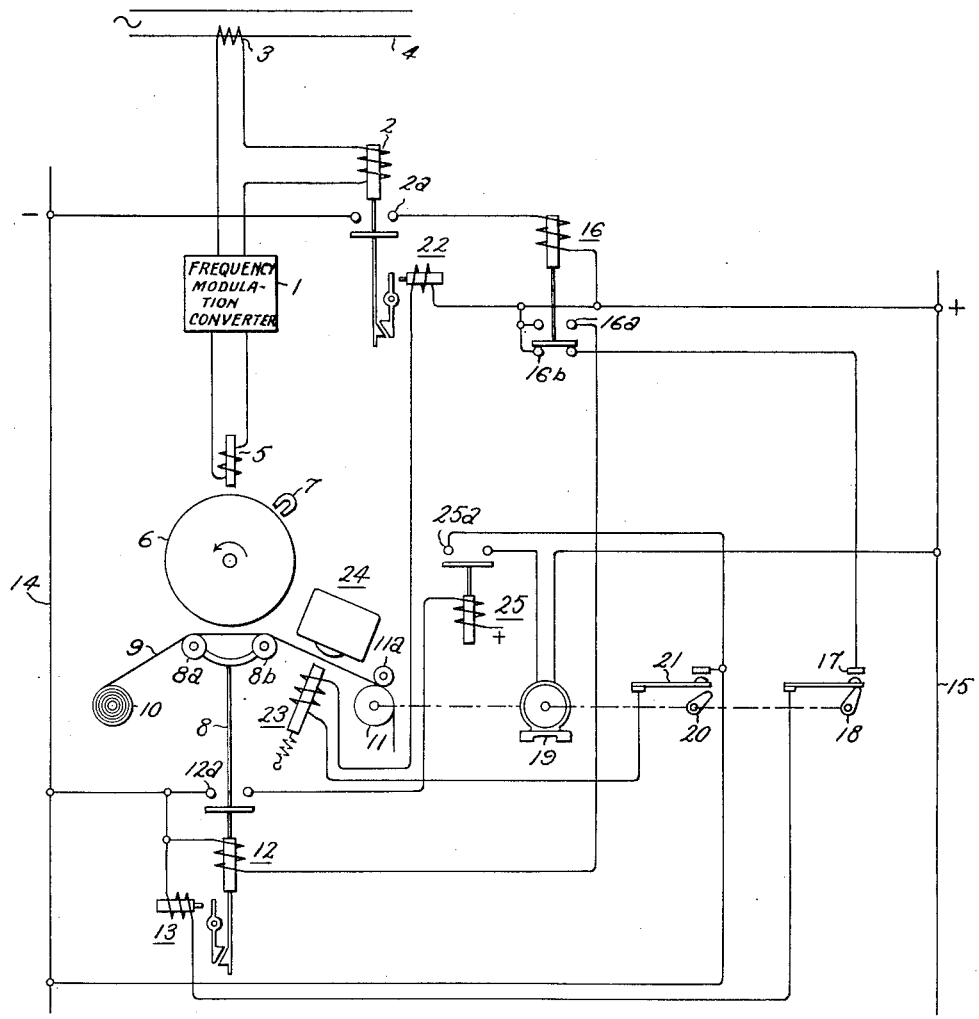
Inventor:
Kenneth R. Geiser,
by Paul A. Frank
His Attorney.

United States Patent Office 2,768,049
Patented Oct. 23, 1956

2,768,049
CONTINUOUS RUNNING RECORDER FOR TRANSIENTS

Kenneth R. Geiser, Schenectady, N. Y., assignor to General Electric Company, a corporation of New York Application May 23, 1951, Serial No. 227,852

3 Claims. (Cl. 346—21)

This invention relates to recording devices and more particularly to devices for recording transients of electrical parameters in electrical transmission systems.

In many power transmission systems it is desirable that a permanent record be made of the wave shapes of any transients which occur on the lines. Since the transients are ordinarily of very short duration, the recording equipment is, of course, automatically actuated and most recorders in present use employ the transients, which they are to record, to initially actuate the recording mechanisms. This means that these recorders are not capable of providing a record of the period preceding the transient. Moreover, due to the unavoidable time lag in the recording mechanism between the beginning of the transient and the time the recording is begun, the first few milliseconds of the transient are also lost. This is highly undesirable since for proper analysis of the transient phenomena not only a record of the complete transients themselves but also a record of the system conditions shortly preceding the transients is often needed.

For the complex power systems of the present day, it is desirable in many situations that a number of simultaneous recordings of various aspects of the systems be taken during the period of a transient. Although multichannel transient recorders do exist, by their design many of them are limited to a smaller number of channels than the eight or more it is many times desired to record in large power systems.

It is an object, therefore, of this invention to provide a new and improved device for recording transients.

It is another object of this invention to provide a device for recording transients which records during the periods shortly preceding the transients as well as during the entire periods of the transients.

It is a further object of this invention to provide a device for recording transients with which a number of simultaneous phenomena may be recorded.

In carrying out this invention, the electrical parameters of whose transients a record is desired are recorded continuously by magnetic means on a moving endless magnetic surface, such as, for example, the peripheral surface of a revolving drum formed of a magnetic material. An erasure head is positioned so that any point on the endless surface passes beneath it shortly before passing beneath the recording head. The erasure head obliterates the record of previous signals so that a fresh surface is always presented to the recording head. Positioned adjacent the endless surface in an area which is remote from the recording head, but so located as to receive any magnetic recording contained upon the endless surface before the recording passes under the erasure head, is a supporting member over which is passed a magnetic tape. Upon the occurrence of a transient, the supporting member is automatically actuated through a suitable control circuit to bring the surface of the tape into contact with the moving endless surface. The circuit also actuates means which move the tape at the same speed as the endless surface through the area in which they are in contact.

The magnetic record made by the recording head on any section of the endless surface is magnetically contact printed on the adjacent section of the tape as the endless surface and the tape move along in contact. This is due to the well-known phenomenon that any magnetized object will oppositely magnetize any nonmagnetized object constructed of magnetic material, if the two objects are placed adjacent each other so that the nonmagnetized object lies in the magnetic field of the magnetized object. Since the area of contact between the tape and the endless surface is remote from the recording head, the wave shapes of the electric parameters shortly before the transient occurred will be transferred to the tape. And if the supporting member is kept in position long enough and the tape kept moving, as are ordinarily done by a suitable delaying circuit, the signals during the entire period of the transient will also be transferred to the tape. This invention thus provides a memory feature in that the conditions of the electric parameter shortly preceding the transient as well as the conditions during the transient itself are permanently recorded. The tape, which may be wound onto a take-up spool, provides a permanent record of the signals. By the use of an endless surface and a tape of sufficient widths and a multiple recording head, a number of simultaneous signals may be recorded permanently on the tape.

For a better and more complete understanding of my invention, together with additional objects and advantages thereof, reference should now be had to the following description and accompanying drawing, which is a schematic diagram of a recording device embodying the present invention.

Referring to the drawing, the input terminals of a frequency modulation converter 1 and the actuating coil of a transient sensing electromagnetic relay 2 are serially connected in a closed circuit with a current transformer 3. Transformer 3 provides an inductive coupling to the external circuit consisting of transmission line 4. Connected across the output terminals of converter 1 is a magnetic recording head 5. Frequency modulation converter 1 may be of any of the circuits, well known to the art, which produce a constant amplitude, frequency modulated output signal indicative of the amplitude variation of the input signal. The frequency modulated signal fed to recording head 5 is recorded magnetically on the endless peripheral surface of a recording drum 6. In order that a good recording may be made, the peripheral surface of drum 6 is formed of a material having a very high magnetic permeability. One example of such a material is the composition, formed of copper, nickel and iron, which is commonly called "cunife," which is also known to have high magnetic retentivity.

An erasure head 7, for example, a permanent magnet, is positioned adjacent the peripheral surface of drum 6 so that any point on the peripheral surface of drum 6 passes beneath it shortly before passing under recording head 5. Erasure head 7 obliterates the magnetic recording on the surface of drum 6 as the drum revolves beneath it. Thus, a fresh recording surface is always presented to recording head 5.

Also positioned adjacent drum 6 is a supporting member 8. With relation to the direction of revolution of drum 6, member 8 is located between recording head 5 and erasure head 7. Mounted on member 8 are two idler rollers 8a and 8b over which a tape 9, whose surface adjacent drum 6 has a high magnetic permeability, passes between a supply reel 10 and a take-up roller 11. Tape 9, for example, can be a steel tape or a plastic tape having an oxide covered surface. To prevent slippage of the tape, an idler roller 11a is positioned to cooperate with the take-up roller 11.

Supporting member 8 is movable into and out of contact with drum 6 by the action of an electromagnetic relay 12. Actually, when member 8 is raised to contact drum 6, the portion of tape 9 lying between idler rollers 8a and 8b is caused to contact and conform with the portion of the peripheral surface of drum 6 adjacent member 8 so that the magnetic record on the surface of drum 6 may be transferred to or, in effect, contact printed on tape 9.

Relay 12 when operated to the raised or print position remains there until it is returned to the "off" position by the action of an electromagnetic reset relay 13. The operating coil of print relay 12 is connected in series across the control power supply conductors 14 and 15 with a pair of normally open contacts 16a mounted on an auxiliary relay 16, while the operating coil of reset relay 13 is serially connected across conductors 14 and 15 with the normally open cam actuated contacts 17 and a pair of normally closed contacts 16b mounted on auxiliary relay 16. The operating coil of relay 16 is in series relationship across the power supply with the pair of normally open contacts 2a mounted on transient sensing relay 2.

The cam 18 which closes contacts 17 once per revolution is driven through suitable gears by a motor 19 which also drives take-up roller 11 and another cam 20 through gearing means. Cam 20 closes a pair of normally open contacts 21 once per revolution and the angular positioning of cam 20 relative to that of cam 18 is such that contacts 21 close slightly before contacts 17. Contacts 21 are serially connected across the supply conductors 14 and 15 with the operating coil of the electromagnetic reset relay 22 associated with transient sensing relay 2 and the operating coil of an electromagnetic time stamp relay 23. Reset relay 22 when operated permits relay 2 to return from the transient recording position to the "off" position, relay 2 being the type relay which locks in the recording position. Time stamp relay 23 operates a plunger which brings tape 9 into contact with the print wheel of a clock mechanism 24.

The cam and tape drive motor 19 is actuated by an electromagnetic relay 25 closing a pair of normally open contacts 25a which are connected in series with motor 19 across power supply conductors 14 and 15. The operating coil of motor relay 25 is serially connected across the power supply with the pair of normally open contacts 12a mounted on relay 12.

In operation the signals in line 4 are fed continuously to converter 1 where they are used to frequency modulate a carrier frequency. The modulated carrier is recorded magnetically by recording head 5 on the peripheral surface of drum 6. The record of any instant is, of course, obliterated by erasure head 7 after drum 6 has made almost a complete revolution. The remainder of the recording device remains dormant until a transient occurs in line 4 and energizes relay 2 to close contacts 2a.

In the diagram the only transient sensing device shown is relay 2 but in actual practice any number of sensing devices sensitive to different parameters in the transmission system, such as, for example, voltage and power, could be employed with this recording device. The simplest manner of connecting additional sensing devices into the recording device shown, assuming that upon actuation the sensing devices close normally open contacts, would be to place those contacts in parallel with contacts 2a. Then the closing of the contacts of any sensing device would set the recording device in action. For use with the system shown, the additional sensing devices would have to lock in the closed or operating position as does relay 2.

The closing of contacts 2a, or any parallel connected contacts, upon the occurrence of a transient on the transmission line causes auxiliary relay 16 to pick up, closing contacts 16a and opening contacts 16b. Since contacts 2a are locked closed until reset relay 22 operates, auxiliary relay 16 will also remain closed until relay 22 operates. When contacts 16a are closed, the operating coil of relay 12 is energized and relay 12 operates closing contacts 12a and bringing tape 9 into contact with drum 6. The closing of contacts 12a energizes the coil of relay 25 and relay 25 then operates to close contacts 25a and thereby connects motor 19 to the power supply.

Motor 19 drives roller 11 at such a speed that the peripheral speed of drum 6 and the speed of tape 9 are substantially identical through the area in which they are in contact. This area of contact between drum 6 and tape 9 will hereinafter be referred to as the printing area. The peripheral distance between the recording head 5 and the printing area is such that the time required for the relaying described above is shorter than the time required for a point on the periphery of drum 6 to move from recording head 5 to the printing area. So, when tape 9 first contacts the peripheral surface of drum 6, the magnetic record on the surface then in the printing area is a record of the conditions on the line during the period shortly before the transient began. As drum 6 continues to revolve, the record of the conditions during the transient moves into and through the printing area.

As each succeeding section of tape 9 moves into the printing area and comes into contact with a particular section on the peripheral surface of drum 6, the magnetic record on that section of the drum is transferred or contact printed on the contacting section of the tape. This is due to the well known phenomenon that any magnetized object will oppositely magnetize a nonmagnetized object formed of magnetic material, which is placed in the magnetic field of the magnetized object. By making both the peripheral surface of drum 6 and the contacting surface of tape 9 of magnetic material having a very high magnetic permeability, a good record of the transient is obtained first on the drum and then on the tape. For example, excellent results may be obtained by making the peripheral surface of drum 6 from "cunife" and coating tape 9 with a ferro-magnetic oxide.

Once the record of what occurred on line 4 both before and during the transient has been recorded on tape 9, the movement of the tape should be stopped and it should be removed from contact with drum 6. In the preferred embodiment shown in the drawing, this is accomplished by setting the device so that every time it is actuated by a transient, it operates long enough to record an average length transient and then tries to shut off. However, if the transient still exists on the line when the recording device tries to shut off, the device cannot do so, but continues to operate.

The timing means necessary to accomplish this feature on the illustrated embodiment are provided by the cams 18 and 20 and their respectively associated contacts 17 and 21. Once relay 25 operates energizing motor 19, cams 18 and 20 rotate since they are mechanically connected to the motor. After a certain length of time, i. e., the time required to record an average length transient, cam 20 closes contacts 21 thereby energizing reset relay 22 and time stamp relay 23.

Time stamp relay 23 operates its associated plunger to bring a section of tape 9 into contact with the print wheel of clock mechanism 24. The approximate time at which the transient occurred is thus stamped on tape 9.

Reset relay 22, by operating, allows relay 2 to drop out and open contacts 2a, if relay 2 is no longer energized from transformer 3. This removes excitation from the coil of relay 16 and allows it to drop out opening contacts 16a and closing contacts 16b. However, if the transient is still present on line 4, relay 2 will not drop out and hence relay 16 will remain energized. In that case, once cam 20 has cleared contacts 21 so that they are again open, the same conditions will exist in the control circuit as before contacts 21 closed and the device continues to record. But if the transient is over, relay 2 and thus relay 16 drop out. When contacts 16a are opened by relay 16, excitation is removed from relay 12 so that it can drop out once reset relay 13 is energized. Relay 13 is energized when cam 18 closes contacts 17 slightly after contacts 21 were closed by cam 20. Relay 13 then operates allowing relay 12 to drop out. Relay 12 in dropping out to the standby position removes tape 9 from the printing area and opens contacts 12a. The opening of contacts 12a removes excitation from motor relay 25. Relay 25 then drops out opening contacts 25a and thereby de-energizing motor 19. The inertia of the mechanical system connected to motor 19 is such that the motor coasts until cam 18 clears contacts 17 allowing them to reopen.

Contacts 16b of auxiliary relay 16 make it impossible for reset relay 13 to be energized if the transient still exists on the system when contacts 17 are closed. This is due to the fact that if the transient still exists, relay 16 will be in the operated position with contacts 16b open. Since contacts 16b are in series with relay 13 and contacts 17, the closing of contacts 17 has no effect if contacts are open.

The record of the transient contained on tape 9 is a permanent record which can be removed from the take-up spool (not shown) immediately after it is obtained and fed through frequency lowering transcribing equipment, or may be left on the spool until some future time when the device is serviced and then put through the transcribing equipment. The transcribing equipment converts the frequency modulated signal to an amplitude modulated signal which can be applied to a direct-writing recorder to give an actual picture of what occurred on line 4 during the transient.

Although only one recording head for recording a single aspect of the transient condition, here current, is illustrated in the drawing, this system is not restricted to recording only one variable quantity but may be used to record a number of the parameters, such as voltage and power, varying during the transient. This is accomplished by spacing a plurality of recording heads side-by-side longitudinally across the surface of drum 6. Each recording head would then act on its own lane around the circumference of drum 6. Erasure head 7 must be sufficiently wide to cover the full width acted upon by the plurality of recording heads, and tape 9 also must be at least of that width.

A recording head may also be provided for recording in one circumferential lane on the peripheral surface of drum 6 the unmodulated carrier frequency of the frequency modulation converters associated with the recording heads. If for some reason the speed of drum 6 should vary, or if tape 9 should slip in the printing zone, the variation or slippage will have an equal effect on the recording of the unmodulated carrier as on the recordings of the desired parameters. And therefore, a true picture of the transient can still be obtained by correcting the recording of the desired parameters for the variation in drum speed or for tape slippage by means of the recording of the unmodulated carrier frequency.

The surface on which the line electrical parameters are continuously recorded need not necessarily be the peripheral surface of a recording drum. Any continuous surface, such as the surface of an endless tape could be used, but best results have thus far been obtained by the use of a drum.

Thus, while what has been described is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What I claim as new and desire to secure by Letters Patent of the United States is:

1. A device for recording a transient of an electrical parameter on a transmission line comprising a moving endless surface; a magnetic recording head positioned adjacent said endless surface for magnetically recording electric signals received thereby upon said endless surface; means including connections for continuously supplying said electric parameter to said recording head; an erasure head positioned adjacent said endless surface to obliterate any magnetic recording contained upon the portions of said surface passing thereunder; a magnetic tape; means actuated by said transient for moving said tape at substantially the same rate as said endless surface; and means actuated by said transient for bringing said tape into contact with said endless surface in an area remote from said recording head, said area being located to receive any magnetic recording contained upon said endless surface before said recording passes under said erasure head thereby to obtain on said tape, by contact of said tape with said endless surface only, a magnetic print of a portion of said electric parameter preceding the occurrence of said transient as well as a recording of said transient.

2. A device for recording a transient of an electrical parameter on a transmission line comprising a moving endless magnetic surface; a frequency modulation converter for producing frequency modulated output signals representing amplitude variations in the input signal supplied thereto; means including connections for continuously supplying said electric parameter to said frequency modulation converter; a magnetic recording head positioned adjacent said endless surface for magnetically recording electric signals received thereby upon said endless surface; means including connections for supplying the output signals of said converter to said recording head; an erasure head positioned adjacent said endless surface to obliterate any magnetic recording contained on the portions of said surface passing thereunder; a magnetic tape; means actuated by said transient for moving said tape at substantially the same rate as said endless surface; means actuated by said transient for bringing said tape into contact with said endless surface in an area remote from said recording head, said area being located to receive any magnetic recording contained upon said endless surface before said recording passes under said erasure head, thereby to obtain a contact magnetic print on said tape representative of a portion of said electric parameter preceding the occurrence of said transient as well as a print representative of said transient.

3. A device for recording a transient of an electrical parameter on a transmission line comprising a rotating recording drum whose peripheral surface is composed of a material having high magnetic permeability and high magnetic retentivity; a magnetic recording head positioned adjacent said peripheral surface for magnetically recording electric signals received thereby upon said surface; means including connections for continuously suplying said electric parameter to said recording head; an erasure head positioned adjacent said peripheral surface to obliterate any magnetic recording contained upon the portions of said surface passing thereunder; a magnetic tape; means actuated by said transient for moving said tape at substantially the same rate as said peripheral surface; and means actuated by said transient for bringing said tape into contact with said peripheral surface in an area remote from said recording head, said area being located to receive any magnetic recording contained upon said peripheral surface before said recording passes under said erasure head, thereby to obtain on said tape, by contact of said tape with said peripheral surface only, a magnetic print of a portion of said electric parameter preceding the occurrence of said transient as well as a recording of said transient.

References Cited in the file of this patent
UNITED STATES PATENTS

| | | |
|---|---|---|
| 1,883,907 | Hathaway | Oct. 25, 1932 |
| 2,098,689 | Masson | Nov. 9, 1937 |
| 2,378,383 | Arndt | June 19, 1945 |

OTHER REFERENCES

"Duplicating Magnetic Tape by Contact Printing," Camras and Herr, "Electronics Magazine," pps. 78–83, December 1949.